Oct. 20, 1964 R. FERWERDA Re. 25,664

AXIALLY AND CIRCUMFERENTIALLY MOVABLE BOOM FOR DIGGING APPARATUS

Original Filed March 18, 1960 2 Sheets-Sheet 1

INVENTOR.
RAY FERWERDA
BY
Meyer, Baldwin, Doran & Young
ATTORNEYS

INVENTOR.
RAY FERWERDA

BY

Meyer, Baldwin, Doran & Young
ATTORNEYS

United States Patent Office

Re. 25,664
Reissued Oct. 20, 1964

25,664

AXIALLY AND CIRCUMFERENTIALLY MOVABLE BOOM FOR DIGGING APPARATUS

Ray Ferwerda, 1050 NW. 163rd Drive, North Miami, Fla.

Original No. 3,069,033, dated Dec. 18, 1962, Ser. No. 16,092, Mar. 18, 1960. Application for reissue Dec. 20, 1963, Ser. No. 342,584
2 Claims. (Cl. 214—141)

Matter enclosed in heavy brackets [ ] appears in the original patent but forms no part of this reissue specification; matter printed in italics indicates the additions made by reissue.

This invention relates to an earth handling apparatus such as a backhoe having a movable boom which is adapted for motion axially and circumferentially and is particularly adapted for attaching a backhoe digging tool to its distal end.

It is an object of the present invention to provide an improved digging apparatus comprising in combination a vehicle, a boom, support means for the boom having a pivot point for up and down motion and adapted to be fastened to the vehicle, means for fastening a tool such as a backhoe to one end of the boom, means for moving the boom axially, and means for moving the boom circumferentially to thus impart an up and down motion, a back and forth motion, and a twisting motion to the tool fastened to the distal end of the boom.

Another object of the present invention is to provide novel means for axially and circumferentially moving a boom operatively connected to a vehicle and having a tool such as a backhoe fastened on its distal end.

It is an object to provide an improved digging apparatus particularly adapted for a backhoe tool in which the backhoe is mounted on a boom which can be twisted circumferentially as well as moved axially along its longitudinal axis.

It is an object of the present invention to provide an improved digging apparatus comprising in combination a vehicle, a movable boom, a support for the boom and pivotably attached to the vehicle, a backhoe attached to the distal end of the boom, and a carriage frame rigidly connected to the boom support for slidably and rotatably mounting the boom therewithin whereby the boom can be moved both axially and circumferentially.

Other objects and advantages of the present invention will be apparent from the description that follows, the appended claims and from the drawings in which:

The present invention provides an improved material handling apparatus comprising a novel combination of a vehicle, a boom support pivotably attached to the vehicle, means for fastening a tool, which is preferably a backhoe, at one end of the boom, means for axially moving said boom fixed on said support and operatively connected between the support and the boom, and boom twisting means fixed on said support and operatively connected between the support and the boom for moving the boom circumferentially, both the axial moving means and the boom twisting means being attached to the support on the same side of the pivot point thereof. Thus, improved apparatus provides a back and forth motion and a twisting motion to the backhoe as well as an up and down motion.

Figure 1:
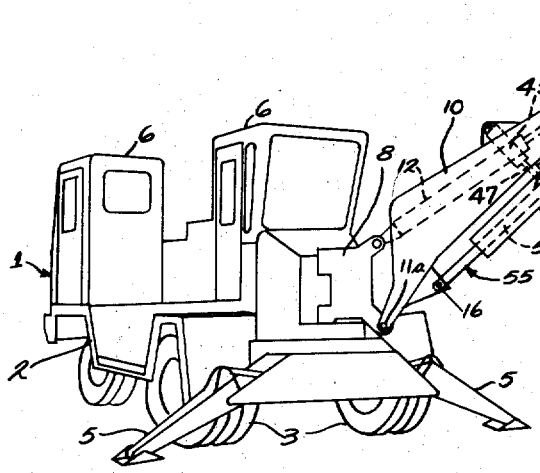
FIG. 1 is a perspective view showing the improved digging apparatus of the present invention which includes a vehicle, a boom having a backhoe attached on its distal end, a boom support pivotally mounted on the vehicle and means for axially and circumferentially moving the boom.
Figure 2:
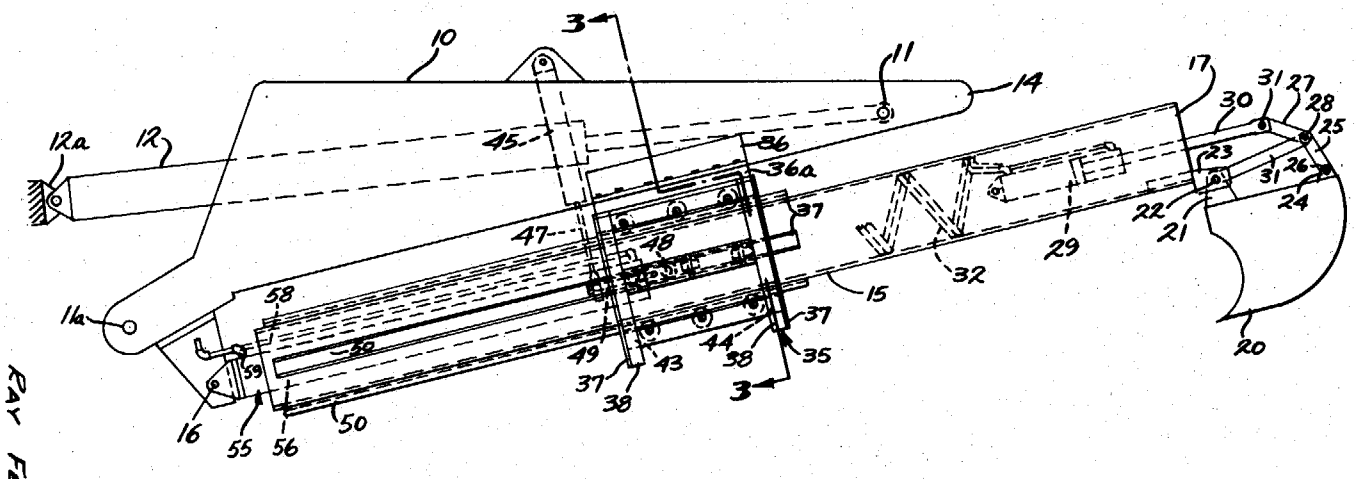
FIG. 2 is an elevational sectional view illustrating the boom support shown in FIG. 1, the movable boom, and means for circumferentially and axially moving the boom according to the present invention.

As shown in FIGS. 1 and 2, the improved digging apparatus of the present invention comprises a vehicle 1 of rigid construction having a platform 2 mounted on wheels 3. A pair of front lateral bracing legs 5 and operator cabs 6 are attached to the platform 1. As seen in FIG. 1, which illustrates a preferred embodiment of the present invention, the vehicle 1 has a rigid front mounting member 8 which supports pivotably thereon a boom support 10. The boom support, in the embodiment illustrated has pivot points 11 and 11a, with pivot 11a being located at one end and adapted for attachment to the vehicle. Means for moving the boom support 10 about its pivot point 11a such as a hydraulic jack member 12 is provided to give the distal end 14 of the support an up-and-down motion. The jack member 12 is pivotably attached to the vehicle at point 12a and to boom support 10 at point 11.

A movable boom 15 is mounted at its left end to the boom support 10 through fluid motor 55, having a pivot point 16 at one end adapted for attachment to the support.

The boom 15 has means for fastening a tool at its distal end 17. In the embodiment shown in FIGS. 1 and 2, the tool comprises a backhoe 20 which is the preferred tool used in the improved apparatus of the present invention, although other tools such as a bucket can be used to advantage. The forward upward portion of the backhoe is provided with ears 21 which are mounted to pivot pin 22 which in turn is carried within brackets 23 securely mounted on the boom end. The backhoe 20 also has rearwardly disposed upper ears 24 which are pivotably connected to arm 25 by pin 26. Arm 25 is also operatively connected to arm 27 by link pin 28.

It can be seen in FIG. 2, for instance, that the arms 25 and 27 depend from the piston rod 30 of an actuating cylinder and piston motor 29 and the arm 27 is pivotably connected thereto by means of pin 31 whereby motion of the piston rod 30 swings backhoe 20 around the pivot pin 22 as well as pivot point 31.

The actuating motor 29 is hydraulically driven and has a retractable wire-covered hose 32 to convey hydraulic fluid to and from the motor or jack member 29.

In a preferred embodiment of the present invention, a carriage frame 35, having inner frame 35b and outer frame 35a relatively rotatable about the longitudinal axis of boom 15, is provided which is adapted for both slidably and rotatably mounting the movable boom therewithin.

Figure 3:
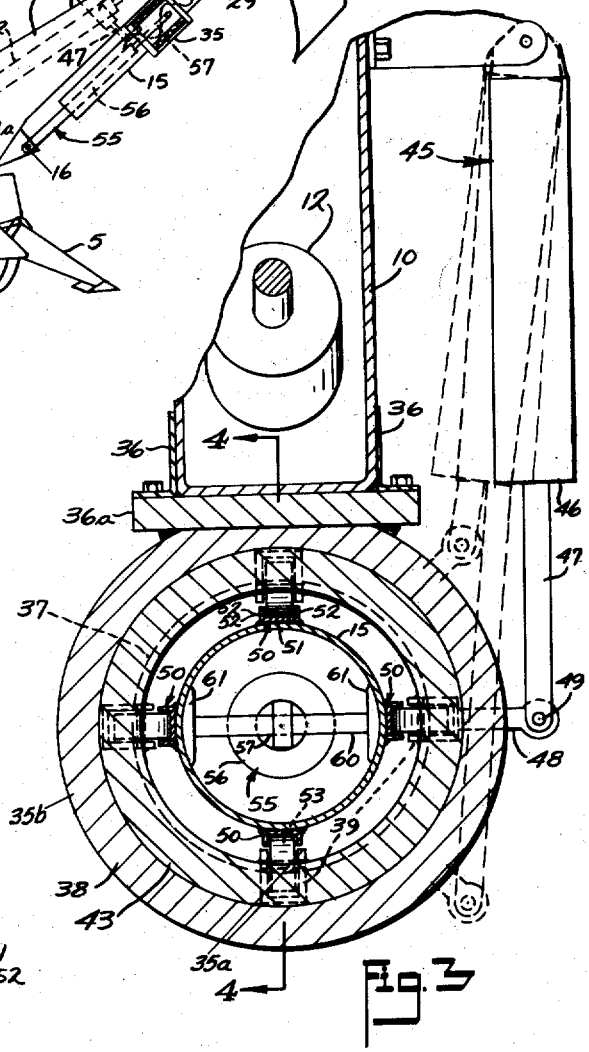
FIG. 3 is a sectional view taken along the line indicated at 3—3 of FIG. 2.

As seen in FIGS. 1 and 3, the frame 35a is rigidly connected to the boom support 10 by plates 36 and 36a, the latter plate being welded to the frame near each end thereof.

Figure 4:
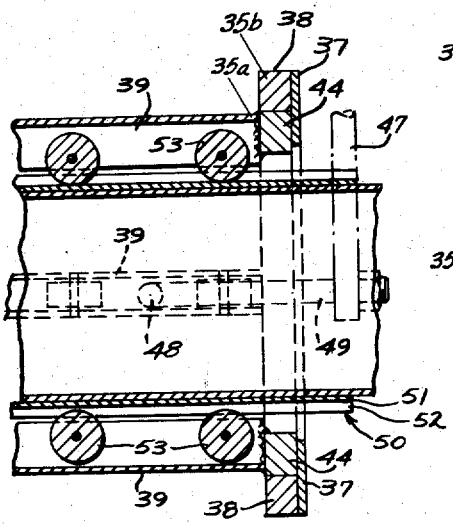
FIG. 4 is a sectional view taken along the line indicated at 4—4 in FIG. 2.

As best seen in FIGS. 2, 3 and 4, the carriage frame 35a comprises a pair of end thrust rings 37 and a pair of fixed rings 38, each of which fixed rings is adjacent to and disposed inwardly of said thrust rings. Each pair of the thrust and fixed rings are held spaced apart by means of their aforesaid rigid connection to plate 36a.

Thus, as noted in the drawings, each fixed ring is welded to the plate 36a and bears outwardly against its adjacent thrust rings.

The frame 35b comprises a plurality of hollow longitudinally extending rails 39 having a U-shaped cross section to form a squirrel cage type of frame. There should be at least three rails 39 in accordance with the present invention, although, as shown, four rails are highly preferred when the boom is cylindrical. When the boom has four or five sides or more, there may be four, five or more corresponding rails.

As an illustration of the preferred boom twisting means of the present invention, a pair of twist rings 43 and 44 are provided on each end of the frame and held rigidly in spaced relationship by the aforesaid rails which are welded on each end to one of the twist rings in frame 35b. Each twist ring is disposed within one of the first rings 38 and adapted to rotate therein in order to eventually provide the boom with a circumferential motion.

As seen in the drawings, each twist ring is concentric with its enveloping fixed ring and in the same plane therewith. Thus, both the twist and fixed rings bear against the interior side of the thrust ring. According to the present invention, the twist rings are connected to a twist cylinder and piston motor 45 having a cylinder member 46 and a piston actuated member 47. In the embodiment shown herein, the cylinder 46 is mounted on the boom support 10 and the piston member 47 is operatively connected to the twist rings 43 and 44 of frame 35b. Thus, movement of the piston 47 rotates the twist ring 43 and frame 35b circumferentially relative to frame 35a.

The twist rings 43 and 44 are connected to the twist motor 45, in the preferred embodiment shown, to the piston member 47 of the twist cylinder. The twist ring and cylinder piston are connected through crank arm 48 which, in turn, is rigidly connected to one of the rails 39. The rail 39 and connecting crank arm 48 are connected by pivot pin 49 to the distal end of the piston 47 and rigidly connected to one end of the crank arm 48. As seen in FIG. 3, the movement of piston 47 can twist the boom through an angle of 90 degrees, the two extreme up and down positions of the piston and twist cylinder being shown in dot-dash lines.

Further describing the boom twisting means, a plurality of channels 50, equal in number to the number of rails 39, are provided preferably around the outer periphery of the boom 15 equally spaced thereon and welded thereto and disposed around the boom in a direction parallel to the longitudinal axis thereof. Each of the channels opens radially outwardly and has a base 51 and side walls 52, as shown in the preferred embodiment in the drawings.

As seen in FIG. 4 for instance, friction reducing means comprising a plurality of rollers 53 are rotatably mounted by shafts to rails 39 on the frame 35b at spaced points circumferentially about the boom within the channels 50 thereof and within the hollow rails 39 of the frame 35b whereby the boom is moved easily in an axial direction within the interior of the frame 35 by the rolling action of the rollers 53 in the channels 50.

A telescoping motor 55 is provided to move the boom 15 axially through the frame. The motor or hydraulic jack means 55 comprises a cylinder member 56, connected to boom support 10 by pivot 16, and a piston member 57; and the piston member is actuated by hydraulic fluid from lines 58 and 59 by suitable controls, not shown. Thus, it is seen that movement of the main cylinder piston 57, which is operably connected to the boom by means of a clevis pivoting on a cross bar 60 fastened to interior boom brackets 61, pushes the boom axially in and out through the frame 35.

When a twisting action is desired for the backhoe 20, the piston 47 of the twist cylinder may be activated by controls not shown to move and rotate the twist rings. The rotation of the twist rings, which are connected to the boom 15 through contact of the rollers 53 with channels 50 and rails 39, also rotates the boom 15. As best seen in FIG. 4, when the twist rings 43 and 44 start to rotate, one of the sides 52 of the channels 50 is brought to bear against the side of each of the rollers 53. This contact twists the boom 15 circumferentially.

As best seen in FIG. 1, hydraulic lines 58 and 59 bring hydraulic fluid to the jack member 55 and lines 32 bring fluid to the actuating cylinder 28. The hydraulic lines are preferably fed from a common source, which source can be opened, closed and controlled from the cab of vehicle 1.

Thus, the present invention comprises an improved backhoe tool which is operated on the end of a boom. The boom conveniently can be twisted circumferentially or moved in and out axially to provide the same action on the backhoe itself.

It is to be understood that in accordance with the provisions of the patent statutes, this invention is not limited to the particular apparatus shown and described herein and that various modifications of said apparatus can be made without departing from the invention.

What is claimed is:

*1.* In combination with a vehicle, an elongated boom support pivotally mounted at one end on said vehicle, an elongated boom, a boom supporting frame having spaced cylindrical twist rings concentric with said boom, bearing means supporting said twist rings for rotation therein, said bearing means suspended from said boom support intermediate the ends of said support, means preventing movement of said frame relative to said support longitudinally of the latter, means mounting said boom in said frame for rotation with said rings and for axial movement relative to said frame, power means carried by said boom support and operatively connected with said frame to cause rotation of said rings in said bearings, a motor having coacting cylinder and piston members, one member pivotally connected to said vehicle, and the other member connected to said boom to move the latter axially through said frame, and means for mounting a tool near the end of said boom remote from said vehicle.

*2. In combination with a vehicle, a boom support pivotally mounted on said vehicle, an elongated boom, a boom supporting frame having spaced cylindrical twist rings concentric with said boom, bearing means supporting said twist rings for rotation, said bearing means carried by said boom support, means preventing movement of said frame relative to said support longitudinally of the latter, means mounting said boom in said frame for rotation with said rings and for axial movement relative to said frame, power means carried by said boom support and operatively connected with said frame to cause rotation of said rings in said bearings, a motor having coacting cylinder and piston members, means connecting one of said members to a part fixed against longitudinal movement along the axis of said boom and connecting the other of said members to a part fixed to said boom to move the latter axially through said frame, and means for mounting a tool near the end of said boom remote from said vehicle.*

References Cited by the Examiner

The following references, cited by the Examiner, are of record in the patented file of this patent or the original patent.

UNITED STATES PATENTS

| | | | |
|---|---|---|---|
| 1,321,531 | 11/19 | Manierre | 198—119 |
| 2,541,045 | 2/51 | Ferwerda | 214—132 |
| 2,669,367 | 2/54 | Wills et al. | 214—138 |
| 2,857,065 | 10/58 | Ferwerda | 214—132 |

HUGO O. SCHULZ, *Primary Examiner.*